United States Patent Office 3,784,685
Patented Jan. 8, 1974

3,784,685
COSMETIC COMPOSITIONS TO REDUCE GREASY APPEARANCE OF THE HAIR AND SKIN
Gregoire Kalopissis, Paris, Claude Bouillon, Eaubonne, and Georges Manoussos and Claudine Berrebi, Paris, France, assignors to Société Anonyme dite: L'Oreal, Paris, France
No Drawing. Filed July 21, 1970, Ser. No. 56,962
Claims priority, application Luxembourg, July 23, 1969, 59,150
Int. Cl. A61k 7/06
U.S. Cl. 424—70    4 Claims

ABSTRACT OF THE DISCLOSURE

The active ingredient in a cosmetic preparation to reduce the greasy appearance of hair and skin has the formula:

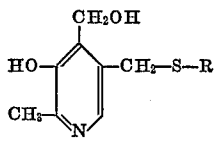

in which R is an organic radical having at least one amine function and can include a carboxylic acid function, the latter can be esterified or amidified. The amine function can be salified by a mineral or organic acid and be substituted with an acyl or sulfonyl group, or substituted with one or two alkyl radicals which, in turn, can include an acid, acid ester, amide, amine, alcohol or quanide substituent or the amine function can be quaternized. The active ingredient can be administered in a conventional medium both orally and as a topical remedy by applying same to the skin.

---

The present invention relates to new preparations and compounds having remarkable dermatological properties, and, in particular, to cosmetic compositions.

It is known that 3-hydroxy - 4,5 - dihydroxymethyl-2-methylpyridine, also called "pyridoxine," with the formula:

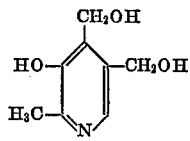  (I)

has interesting dermatological properties.

We have discovered that by combining the properties of the compound of Formula I and the specific properties of cysteine and cysteamine or their derivatives, it is possible to prepare compositions having remarkable dermatalogical properties.

In particular, remarkable results are obtained by means of compounds deriving from cysteine or cysteamine by substitution on the sulphur atom of a remainder derived from the pyridoxine.

The present invention concerns the novel industrial product formed by a cosmetic preparation, characterized in that it contains, in a suitable medium, at least one compound corresponding to the formula:

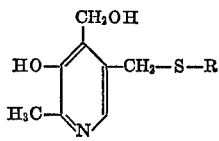  (II)

in which R represents an organic residue with at least one amine function and optionally, a carboxylic acid function.

The acid function can be esterified or amidified, while the amine function can be salified by a mineral or organic acid, substituted by an acyl, sulfonyl radical, one or two alkyl radicals which can comprise acid, ester, amide, amine, alcohol, quanidine functions, or it can also be quaternized.

According to a variation, the remainder R corresponds to the group:

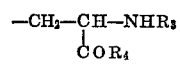

in which $R_3$ represents a hydrogen atom, a radical $SO_2R'$, a radical $COR'$ in which $R'$ represents a lower alkyl radical of 1 to 4 carbon atoms or an aryl or $\alpha$-amino acyl radical, $R_4$ represents a hydroxy, alkoxy radical or $-NH_2$.

According to a variation, the remainder R corresponds to the group:

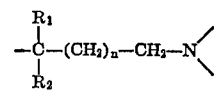

in which $R_1$ and $R_2$ represent a hydrogen atom or a lower alkyl radical of 1 to 3 carbon atoms, $R_1$ and $R_2$ being either identical or different; the amine function may be salified by a mineral or organic acid, substituted by a radical COR', $SO_2R'$ in which R' has the same signification as above, one or two alkyl groups which may comprise acid, ester, amide, amine, alcohol, guanidine functions, or it may be quaternized, n is an integer equal to 0 or 1. Among the mineral and organic acids which can be used, we cite hydrochloric acid, malic acid, citric acid, tartric acid, nicotinic acid.

Among the compounds which can be used according to the invention, we cite those selected from the group formed by S-(5 - hydroxy-4-hydroxymethyl-6-methyl-3-pyridyl-methyl) l-cysteine, which has the formula:

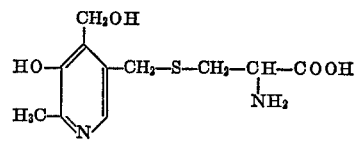

β-aminoethylthio-5-methyl 3-hydroxy 4-hydroxymethyl 2-methyl pyridine dichlorohydrate, having the formula:

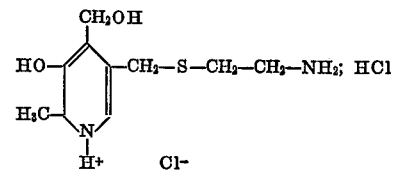

(5-hydroxy 4-hydroxymethyl 6-methyl 3-pyridyl) methyl-thio-2 ethylammonium malate, with the formula:

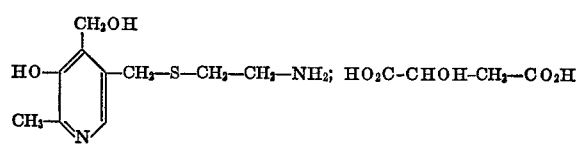

The process for preparing the compounds of Formula II described above comprises a first stage in which we transform pyridoxine hydrochloride, whose phenol function in position 3 and alcohol function in position 4, have been blocked by centralization in an acid medium, into a chlorinated derivative through the action of thionyl chloride, and a second stage in which we carry out the reaction on the chlorinated derivative obtained of a thiol or alkaline thiolate having the formula:

in which A represents either a hydrogen atom, or an alkaline group and R has the significance indicated for Formula II, and finally we effect the hydrolysis of the group protecting the OH of the pyridoxine in positions 3 and 4 under the action of a diluted mineral or organic acid.

The cetalization necessary for the blocking of the two hydroxy groups of the pyridoxine hydrochloride may be effected either by means of acetone, or by cyclohexanone, cyclopentanone and methyl ethyl ketone.

It is also possible to proceed to this cetalization by means of an aldehyde such as benzaldehyde.

In another method to carry out the process, it is also possible to replace the cetalization by an acylation and in particular by an acetylation.

In a variation of the process, the thiol which is to react on the chlorinated derivative of the pyridoxine is first transformed into a thiolate through the action of a basic agent such as an alcoholate, an amine or a mineral base in a solvent, preferably a polar solvent.

Another preparation process permits obtaining the compounds of Formula II; it consists in reacting a halogenated derivative of formula RX (R having the significance indicated for Formula II) on a pyridoxine derivative having the formula:

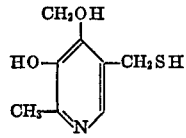

The process for preparing the compounds of Formula II in which

R=—CH₂—CH—CO₂R'
         |
         NHCOCH₃

(R' representing a hydrogen atom or a lower alkyl radical) consists in reacting an α-acetamidoacrylate having the formula:

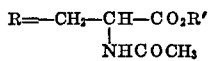

on a pyridoxine derivative having the formula:

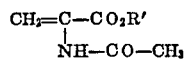

In a first embodiment, the composition may constitute a cosmetic preparation in the form of a solution or a dispersion, a cream or a gel. The preparation is then intended to be applied directly on the skin. According to this embodiment, the cosmetic preparation contains from 0.1 to 5% and preferably from 1 to 3% by weight of active component.

The cosmetic preparation according to the invention may also comprise various cosmetic additives which also depend upon the use to which it is intended. Thus, the preparations according to the invention may also be presented in the form of a solution containing surface active agents and constitute a shampoo.

The preparations according to the invention may also be in the form of alcoholic or hydroalcoholic solutions containing also resins such as those used generally in hairspray and hairsetting lotions. In this particular case, they may be conditioned in the form of aerosols so as to constitute hairsprays intended to keep the hair in a particular shaping.

In a second embodiment according to the invention, the preparation may be in the form of an ingestable compound intended for a treatment by mouth. In this case, the medium for the preparation is composed of any conventional edible support, conditioned under the form of pills, tabets, capsules, and ampoules.

According to this embodiment, the concentration of the active compound is between 0.75 and 3% and preferably between 1 and 1.5% by weight.

For better understanding of the invention, we shall now give some examples of preparation of the various active compounds, as well as examples of cosmetic preparations according to the invention.

EXAMPLE A

Preparation of S-(5-hydroxy-4-hydroxymethyl 6-methyl 3-pyridyl methyl) l-cysteine (VI)

The compound VI was prepared from pyridoxine hydrochloride (I, HCl) according to the following reactional diagram:

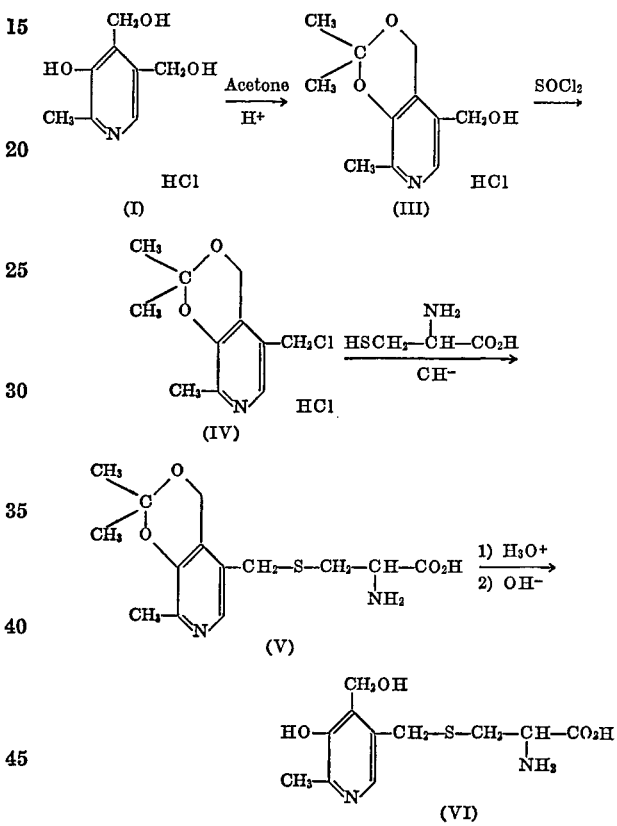

The hydroxyls of the phenol function at 3 and alcohol function at 4 of the pyridoxine are blocked by formation of cetal with the acetone in acid medium; the free hydroxyl at 5 is then easily substituted through the action of the thionyl chloride; by reaction of the chlorinated derivative IV with the cysteine, then cutting of the protecting isopropylidene group in acid medium, we obtain the desired product VI.

(a) Preparation of 5-hydroxymethyl 2-trimethyl, 2,8, 4H m-dioxino(4,5-c) pyridine hydrochloride (III)

Dry HCl is mixed or stirred in a well shaken suspension of 150 g. of pyridoxine hydrochloride (I, HCl) in 1,500 cm.³ of anhydrous acetone while maintaining the temperature between 5 and 10° by means of an ice bath. The solid passes into the solution after 1½ hour to 2 hours. The stirring of HCl is continued for another 30 minutes at 5–10° C., then the ice bath is removed and the insertion of HCl is stopped when the temperature reaches 20° C. The solution has then absorbed between 650 and 700 g. of HCl. The stirring is continued for 1 hour at 20° C., then it is left standing for 15 hours at —15° C. The crystals formed are filtered and the hydrochloric acid is removed from the solution by means of a rotary evaporator under vacuum at 20° C. After cooling of the solution for a few hours at —15° C., a new batch of crystals, which is added to the first batch, is collected.

The crystals are washed with anhydrous acetone until it yields a colorless filtrate, then they are dried. The yield is 97% (173 g.). The product melts at 210–215° C. and does not contain any free phenol (dichloroquinone chlorimide test).

(b) Preparation of 5-chloromethyl 2-trimethyl, 2,8 4H m-dioxine(4,5-c) pyridine hydrochloride (IV)

173 g. of III are added in portions to 500 cm.$^3$ of thionyl chloride; the solution obtained is agitated for 4 to 5 hours at normal temperature, then it is allowed to stand overnight. The excess thionyl chloride is evaporated under vacuum; the solid residue is picked up by 200 cm.$^3$ of absolute ethanol, agitated for one hour, filtered, washed with ethanol, then with ether and dried. 163 g. of IV are obtained. The mother-waters still precipitate 8 g. of IV after addition of ether. The product melts at 175–178° C. and is sufficiently pure for the subsequent reactions (it is tested with dichloroquinone chlorimide to ascertain that it does not contain any free phenol.)

(c) Preparation of (2-trimethyl, 2,8 4H m-dioxino (4,5-c) 3-pyridyl methyl thio)-3 alanine (V)

A solution of 31.5 g. of cysteine hydrochloride in 200 cm.$^3$ of water and 200 cm.$^3$ of ethanol is neutralized, under nitrogen and under agitation, by 40 cm.$^3$ of N soda. 53 g. of IV and 40 cm.$^3$ of 5 N soda are added simultaneously to this solution. When the addition is completed, 40 cm.$^3$ of 5 N soda are again inserted slowly. Stirring is continued for 1 hour. The nitro-prussiate test verifies that there is no free thiol left. The solution is acidified by 40 cm.$^3$ of HCl 5 N, then it is left for 1 hour at 0° C.; the precipitate formed is filtered, washed in water and dried under vacuum in the presence of $P_2O_5$. The product V is a white solid (yield 75%), not very soluble in ethanol, insoluble in water and acetone, and producing gels in a crystallized hydro-alcoholic medium; in an ethanol-acetonitrile mixture, it melts at 228–230° C.

(d) Preparation of VI

Product VI was prepared by hydrolysis of product V in hydroalcoholic medium at 80° C., in the presence of hydrochloric acid (2 equivalents)—Yield: 91%. It is more generally obtained from IV without separation of intermediary V: The reaction mixture of IV with cysteine hydrochloride in the presence of soda is acidified by 120 cm.$^3$ of HCl 5 N and brought to boiling for 15 to 20 minutes. After cooling, the solution is passed through an ion-exchanging resin (acid form), which retains the reaction product and the Na$^+$ ions; after abundant washing of the resin with water, a treatment with an ammonia solution liberates product VI therefrom. The solution obtained is dry concentrated under vacuum and the residue is picked up by acetone, filtered, washed with acetone and dried: it weighs 50 g. (yield 92%) and melts at 215–220° C. This crude product may be crystallized in a mixture of water and acetonitrile. 29 g. of yellowish-white flakes, not very soluble in water, methanol and ethanol, are collected; they melt at 220–224° C.

Product VI has a rotatory power: $D^{22}+20°$ (c.=1, HClN).

Analysis.—$C_{11}H_{16}N_2O_4S$—Calculated (percent): N, 10.39; S, 11.77. Found (percent): N, 10.30; S, 11.75.

Through the action of HCl, product VI easily produces a hydrochloride, which crystallizes in a mixture of methanol and acetonitrile under the form of white crystals. Melts at 210–215° C.

EXAMPLE B

Preparation of β-5-aminoethylthiomethyl 3-hydroxy-4 hydroxymethyl 2-methyl pyridine dichlorhydrate (VII)

This compound may be prepared following the diagram indicated in Example 1 for preparation of product VI by having the β-aminoethanethiol react on IV instead of cysteine.

Operating procedure: A mixture of 53 g. of IV and 29.7 g. of β-aminoethanethiol hydrochloride in 200 cm.$^3$ of water and 200 cm.$^3$ of ethanol is neutralized by 80 cm.$^3$ of soda 5 N under nitrogen and under strong agitation. 40 cm.$^3$ of soda 5 N are still added and the agitation is continued for one hour. The solution is then heated for 10 minutes under reflux with 120 cm.$^3$ of HCl 5 N; after dry concentration, the residue is treated with 1000 cm.$^3$ of methanol and a little water, ethyl acetate is added until it is turbid, then it is left to crystallize at normal temperature. The product (37 g.) is under the form of white needles soluble in water, insoluble in methanol and in ethanol; it melts at 218° C.

By concentration of the mother-waters and addition of ethyl acetate, another 20 g. of product VII are collected. Total yield: 95%.

Analysis.—$C_{10}H_{18}Cl_2N_2O_2S$—Calculated (percent): Cl, 23.54; N, 9.30; S, 10.64. Found (percent): Cl, 23.53; N, 9.02; S, 10.45.

Acid index (meq./g.)—Calculated, 9.96 (phenol and 2 HCl).—Found, 9.95.

Formula:

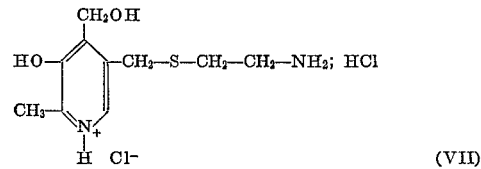

(VII)

EXAMPLE C

Preparation of 5-β-aminoethylthiomethyl 3-hydroxy 4-hydroxymethyl 2-methyl pyridine (VIII)

Compound VIII was prepared from the compound of Formula IV indicated in Example A, according to the following reactional diagram:

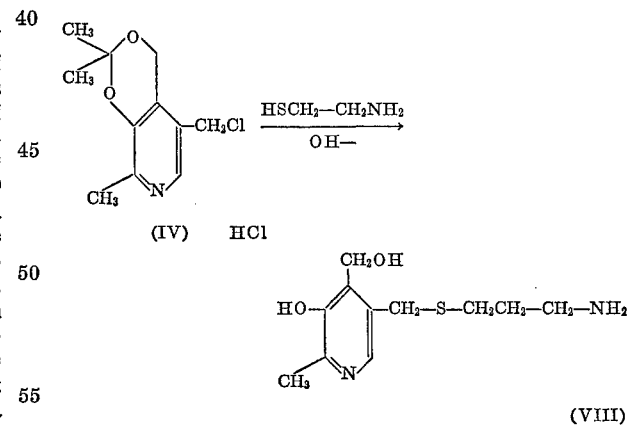

In a well agitated solution of 0.2 mole of (IV) and 0.2 mole of β-aminoethanethiol hydrochloride in 200 cm.$^3$ of water and 200 cm.$^3$ of ethanol, 80 cm.$^3$ of soda 5 N are rapidly inserted, then in 20 minutes 40 cm.$^3$ of soda 5 N.

The agitation is kept up for 30 minutes, then the solution is acidified through the addition of 120 cm.$^3$ of hydrochloric acid 5 N.

The reaction is then brought to boiling.

The solution obtained is dry concentrated under vacuum and the solid residue is dissolved in 150 cm.$^3$ of water.

Soda is then added until pH 8.9, which results in the precipitation of the amine of Formula VIII.

This compound is separated, it is dried, then it is washed with water and with ether.

41 g. of the compound of Formula VIII are obtained, with a melting point equal to 162° C.

EXAMPLE D

Preparation of the (5-hydroxy 4-hydroxymethyl 6-methyl 3-pyridyl) 2-methylthio ethylammonium malate, Formula IX

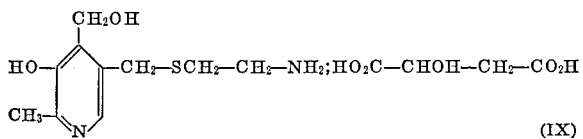

(IX)

The compound of Formula IX is prepared from the compound of Formula VIII and malic acid.

A solution of 9 g. of malic acid in 100 cm.³ of ethanol is added to a hot solution of 13.7 g. of the compound of Formula VIII in 400 cm.³ of ethanol and 30 cm.³ of water. It is brought to boiling.

The malate (IX) crystallizes upon return of the solution to ordinary temperature.

20 g. of crystals are separated, they are dried and washed with water and ethanol.

The product is re-crystallized in a mixture of ethanol and water.

The crystals obtained have a melting point equal to 160–162° C.

Analysis confirmed a rough formula: $C_{14}H_{22}N_2O_7S$.

Quantitative analysis of the nitrogen and of the sulfur showed (percent): Calculated: N, 7.74; S, 8.85. Found: N, 7.71; S, 8.84.

EXAMPLE 1

A preparation according to the invention is prepared by dissolving in 100 cc. of perfumed distilled water: 1.5 g. of the 5β-aminoethylthiomethyl 3-hydroxy 4-hydroxymethyl 2-methyl pyridine dihydrochloride (VII), the formula of which is given in Example B.

EXAMPLE 2

A preparation according to the invention is made by proceeding to effect the following mixture:

Compound of Formula VI _____ g__ 0.54
Methionine _____ g__ 0.50
Hydrochloric acid sufficient for pH 4.
Perfumed distilled water _____ cc__q.s.p__ 100

EXAMPLE 3

A hair lotion according to the invention is prepared by dissolving 3 g. of the compound of Formula VII in 100 cm.³ of a hydroalcoholic solution at 50%.

EXAMPLE 4

A hair setting gel is prepared by mixing:

The compound of Formula IX _____ g__ 0.25
Methyl pantothenate _____ g__ 0.2
Reticulated (or cross linked) polyacrylic acid known under the trade name "Carbopol 940" _____ g__ 0.5
Polyvinyl pyrrolidone _____ g__ 3
Propylene glycol _____ g__ 10
Triethanolamine q.s.p. pH 8.
Perfume _____ g__ 0.1
Alcohol _____ cc__ 20
Preservative based on methyl parahydroxybenzoate sold under the trademark "Nipagine" _____ g__ 0.10
Perservative based on propyl parahydroxybenzoate sold under the trademark "Nipasol" _____ g__ 0.10
2-bromo 2-nitro 1-3 propanediol _____ g__ 0.3
H₂O _____ cc__q.s.p__ 100

EXAMPLE 5

A hair dressing lotion for men is prepared by mixing:

The compound of Formula VII _____ g__ 0.75
Dimethylhydantoin formol resin _____ g__ 0.5
Dimethyl-dilaurylammonium chloride _____ g__ 0.5
Perfume _____ g__ 0.1
Alcohol _____ cc__ 50
H₂O _____ cc__q.s.p__ 100

EXAMPLE 6

A liquid shampoo is prepared with the following composition:

G.
Sodium lauryl sulfate oxyethylenated with 2.2 moles of ethylene oxide _____ 8
Sodium mono lauryl sulfosuccinate _____ 1.5
Polyethylene glycol distearate _____ 1
Lauric diethanolamide _____ 2
The compound of Formula IX _____ 3
Perfume (fragrance) _____ 0.4
Lactic acid, q.s.p. pH=6.5.
Water, q.s.p. 100 g.

EXAMPLE 7

A liquid shampoo is prepared with the following composition:

G.
Sodium lauryl sulfate oxyethylenated with 2 moles of ethylene oxide _____ 6
Sodium monolauryl sulfosuccinate _____ 1
Polyethylene glycol distearate _____ 1
Lauric diethanolamide _____ 2.5
The compound of Formula VII _____ 5
Perfume _____ 0.3
Lactic acid, q.s.p. pH=6.
Water, q.s.p. 100 g.

EXAMPLE 8

A cream shampoo is prepared with the following composition:

G.
Sodium lauryl sulfate _____ 12
Condensation product of the fatty acids of copra on methyltaurine, a paste commercialized under the trade name of "Hostapon C.T." by the company Hoechst _____ 40
Lauric monoethanolamide _____ 2
Glycerol monostearate _____ 4
Compound of Formula IX _____ 3
Latic acid, q.s.p. pH=6.5.
Perfume _____ 0.2
Water _____ q.s.p___ 100

EXAMPLE 9

A powdered shampoo is prepared with the following composition:

G.
Sodium lauryl sulfate _____ 50
Condensation product of the fatty acids of copra on sodium isethionate, known under the trade name of Hostapon K.A." by the company Hoechst _____ 41
Product of Formula VI _____ 8
Perfume _____ 1

EXAMPLE 10

The following solution is prepared:

G.
Resin sold under the commercial trade name of "Resin 28–1310" by National Starch _____ 8
Compound of Formula VI _____ 2
Cedar wood oil _____ 0.5
Cedarwood oil _____ 0.5
2-amino-2-methyl-1-propanol, q.s.p., pH 8.2.
Absolute alcohol _____ q.s.p___ 100

To obtain a hairspray for oily hair, 25 g. of this solution is placed in an aerosol bottle with 52 g. of the fluorochlorinated hydrocarbon liquefied under pressure, known under the trade name of Freon 11 and 23 g. of the fluorochlorinated hydrocarbon liquefied under pressure, known under the trade name of Freon 12.

A good hairspray for oily hair is thus obtained.

EXAMPLE 11

A coloring hair-setting lotion intended to be applied on white hair which has a greasy look, is prepared with the following formula:

|  | G. |
|---|---|
| Polyvinyl pyrrolidone | 0.4 |
| Vinyl acetate-acrylic acid copolymer | 0.2 |
| Alcohol, q.s.p. 50°. |  |
| Compound of Formula IX | 0.7 |
| Aminopropylamino-1 anthraquinone | 0.03 |
| Picramic acid | 0.0170 |
| N-γ-amino propylamino-r N'-methyl-amino-1 anthraquinone | 0.040 |
| Water _____q.s.p | 100 |

The value of the pH is adjusted to 7 by addition of triethanolamine.

A good hair setting lotion is thus produced; after application on white hair, it imparts to the hair a smokey-grey shimmer or hue, while it distinctly decreases the initial greasy appearance of the hair.

Tests were made regarding the activity of the compounds of Formulas VI, VII and IX.

The tests involved in the preparations taken by mouth and applied on the skin. In each of the experiments, 5 batches of Wistar rats of same age, bred by applicant, of average weight 145 g. for females and 165 g. for males, were divided as follows:

Batch I: 5 males, 5 females: normal control animals;
Batch II: 5 males, 5 females: animals subjected to a diet defficient in biotin, so as to cause a marked greasy condition (sticky hair, matting and bunching of hair, loss of hair at various places). This batch is intended to be used as controls.

Composed as Bath II:
Batch III
Batch IV
Batch V and intended to be treated respectively by each of the three compounds of Formula VI, hydrochloride of Formula VI and VII.

(A) Skin application

The product in aqueous solution at 80 mm./l. is applied by means of a brush at the rate of 0.5 ml. per rat on a dorsal area back of the shoulder of 15 cm.², preliminarily shaved (batches III, IV and V).

An application is made every day for 15 days. During the same time, a corresponding volume of solvent is applied on the control group (batch II).

At the end of the experiment, the clinical observations are noted.

Results.—There is a very good improvement through application of the products, particularly with the hydrochloride of the compound of Formula VI.

The lesions were noticeably reduced, and the coat was nearly dry and did not have a sticky, oily or matted appearance. On the contrary, the animals of batch II did not show any improvement, and sometimes even an aggravation.

(B) By mouth

The treatment by mouth lasted 15 days at the rate of 0.5 ml./100 g. of rat per day, of a solution at 0.5 mM./l., by means of a probang, in animals fasting for 17 hours (batches III, IV and V), the control animals of batch II receiving water. The clinical observations are noted and the skin of the back is removed, after the animals are killed, so as to determine the lipid content.

Results.—We notice:

An improvement of the clinical appearance as previously;
A considerable decrease of the lipids in animals of both sexes (between 25 and 45%) as compared to the control animals;

Moreover, a histological examination of the skin permits us to conclude an improvement and even the disappearance of the greasy images (less production of sebum, normal appearance of the glands, which contrasts with the hypertrophied appearance of the control animals).

ACUTE TOXICITY TESTS

Tests were also made regarding acute toxicity of Compound VII and the hydrochloride of Compound VI on the following two animal species:

Wistar rats, males and females, in equal number, originating from the breeding farm of applicant and weighing: 290 g. ±10 for the males, 188 g. ±10 g. for the females;
Mice, Swiss, weighing 22 g. ±2 g.

All these animals had been constantly fed the "Extra Labo" cakes and granules for rats and mice, which are well balanced in proteins, glucides and vitamins. They also received drinking water at will.

The drug was administered to batches of 10 animals for each dose in each species, which had been fasting for 12 hours, with the help of a probang, in aqueous solutions of pH=2.96.

A volume of 1 ml. for each 100 g. of body weight was given, the concentrations being calculated in consequence for each dose.

Twelve hours after administration of the drug, food was given again.

Successive doses were given up to 3 g./kg. After seventy-two hours of observation, there was no mortality in either species.

We claim:
1. A process to decrease the greasy appearance of hair which comprises applying to said greasy appearing hair an effective amount of a cosmetic composition containing in a solvent selected from the group consisting of water, alcohol and hydroalcoholic solution thereof 0.1 to 5% by weight of an active ingredient having the formula:

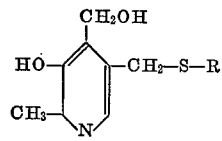

wherein:

R is a radical corresponding to the formula:

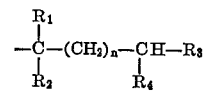

in which
$R_1$ and $R_2$ are selected from the group consisting of hydrogen and lower alkyl radical having 1–3 carbon atoms,
$n$ is 0 or 1,
$R_3$ is selected from the group consisting of —$NH_2$ and —COOH and $R_4$ is selected from the group consisting of hydrogen and —$NH_2$ with the proviso that $R_4$ is —$NH_2$ when $R_3$ is —COOH,
or salts thereof.

2. The process of claim 1 wherein R is

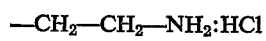

3. The process of claim 1 wherein R is

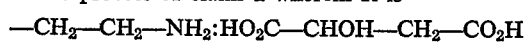

4. The process of claim 1 wherein R is
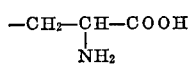
References Cited
UNITED STATES PATENTS
| | | | |
|---|---|---|---|
| 3,625,949 | 12/1971 | Schorre et al. | 424—266 X |
| 3,418,416 | 12/1968 | Fourneau et al. | 424—263 |
| 3,531,490 | 9/1970 | Friedman et al. | 260—294.8 G |
OTHER REFERENCES
Stedman's Medical Dictionary (1968), p. 1432.
Chemical Abstracts, vol. 52, 6435h (1958).
Chemical Abstracts, vol. 58, 1661d (1963).
ALBERT T. MEYERS, Primary Examiner
NORMAN A. DREZIN, Assistant Examiner
U.S. Cl. X.R.
424—263